US012700953B2

(12) United States Patent
Xu et al.

(10) Patent No.: US 12,700,953 B2
(45) Date of Patent: Aug. 4, 2026

(54) SOFT-COMBINING FOR HYBRID AUTOMATIC REPEAT REQUEST FEEDBACK

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US); Tao Luo, San Diego, CA (US); Peter Gaal, San Diego, CA (US); Juan Montojo, San Diego, CA (US); Yisheng Xue, San Diego, CA (US); Ozcan Ozturk, San Diego, CA (US); Olufunmilola Omolade Awoniyi-Oteri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 546 days.

(21) Appl. No.: 17/906,828

(22) PCT Filed: May 13, 2020

(86) PCT No.: PCT/CN2020/089985

§ 371 (c)(1),
(2) Date: Sep. 20, 2022

(87) PCT Pub. No.: WO2021/226865

PCT Pub. Date: Nov. 18, 2021

(65) Prior Publication Data

US 2023/0155743 A1 May 18, 2023

(51) Int. Cl.
*H04L 1/1829* (2023.01)
*H04L 1/00* (2006.01)

(52) U.S. Cl.
CPC .......... *H04L 1/1829* (2013.01); *H04L 1/0041* (2013.01); *H04L 1/0057* (2013.01)

(58) Field of Classification Search
None
See application file for complete search history.

(56) References Cited

U.S. PATENT DOCUMENTS

2013/0223300 A1 * 8/2013 Yang ..................... H04W 72/23
                                                    370/280
2016/0029395 A1   1/2016 Kim et al.
                        (Continued)

FOREIGN PATENT DOCUMENTS

CN      101175271 A    5/2008
CN      101496335 A    7/2009
WO      2019217233 A1  11/2019

OTHER PUBLICATIONS

Yi L., et al., "Enhanced Cooperative-Group Decoding Algorithm Based on Superposition Coding", Journal of Information Engineering University, vol. 16 No. 4 , Aug. 15, 2015, pp. 413-417.

(Continued)

*Primary Examiner* — Marcus Smith
*Assistant Examiner* — Rowan K Fakhro
(74) *Attorney, Agent, or Firm* — Harrity & Harrity, LLP

(57) ABSTRACT

Various aspects of the present disclosure generally relate to wireless communication. In some aspects, a base station may transmit, to a group of user equipment (UEs), a multi-user packet including a plurality of transport blocks combined into a combined transport block, wherein each transport block, of the plurality of transport blocks, is separately encoded using a particular encoding procedure and aggregated into the combined transport block; receive, from one or more UEs of the group of UEs, hybrid automatic repeat request feedback indicating a decoding failure of one or more transport blocks of the multi-user packet; and retrans- (Continued)

mit one or more packets to convey the one or more transport blocks subject to the decoding failure. Numerous other aspects are provided.

30 Claims, 8 Drawing Sheets

(56)                    References Cited

U.S. PATENT DOCUMENTS

| | | | |
|---|---|---|---|
| 2017/0171841 A1 | 6/2017 | Chen et al. | |
| 2017/0257195 A1* | 9/2017 | Maaref | H04L 5/0053 |
| 2018/0317213 A1* | 11/2018 | Islam | H04L 1/1614 |
| 2019/0335431 A1* | 10/2019 | Wang | H04L 1/0057 |
| 2019/0349130 A1* | 11/2019 | Khoshnevisan | H04L 1/0009 |
| 2020/0145964 A1 | 5/2020 | Sengupta et al. | |

OTHER PUBLICATIONS

International Search Report and Written Opinion—PCT/CN2020/089985—ISA/EPO—Feb. 18, 2021.
Supplementary European Search Report—EP20935522—Search Authority—The Hague—Dec. 6, 2023.

* cited by examiner

FIG. 3B

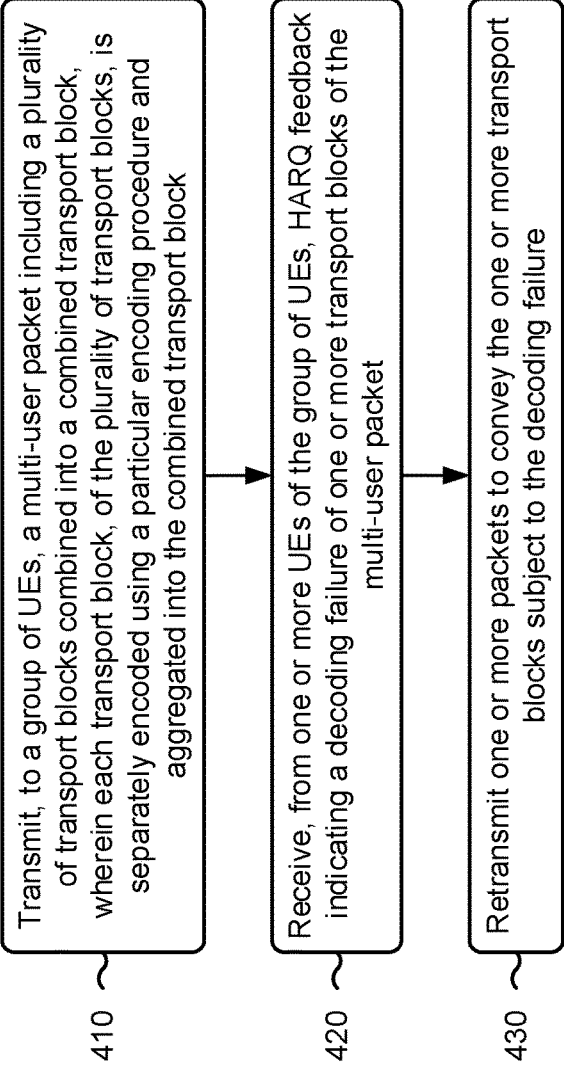

Transmit, to a group of UEs, a multi-user packet including a plurality of transport blocks combined into a combined transport block, wherein each transport block, of the plurality of transport blocks, is separately encoded using a particular encoding procedure and aggregated into the combined transport block Receive, from one or more UEs of the group of UEs, HARQ feedback indicating a decoding failure of one or more transport blocks of the multi-user packet Retransmit one or more packets to convey the one or more transport blocks subject to the decoding failure

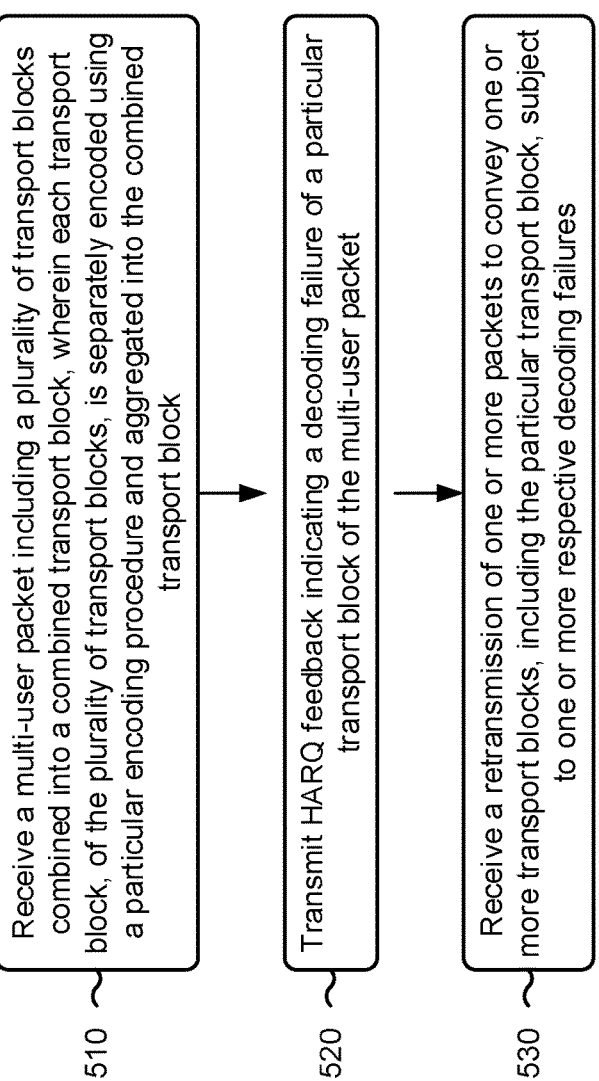

510 Receive a multi-user packet including a plurality of transport blocks combined into a combined transport block, wherein each transport block, of the plurality of transport blocks, is separately encoded using a particular encoding procedure and aggregated into the combined transport block 520 Transmit HARQ feedback indicating a decoding failure of a particular transport block of the multi-user packet 530 Receive a retransmission of one or more packets to convey one or more transport blocks, including the particular transport block, subject to one or more respective decoding failures

SOFT-COMBINING FOR HYBRID AUTOMATIC REPEAT REQUEST FEEDBACK

CROSS-REFERENCE TO RELATED APPLICATION

This Patent Application is a 371 National Stage of Patent Cooperation Treaty (PCT) Patent Application No. PCT/CN2020/089985, filed on May 13, 2020, entitled "SOFT-COMBINING FOR HYBRID AUTOMATIC REPEAT REQUEST FEEDBACK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for soft-combining for hybrid automatic repeat request feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a base station, may include transmitting, to a group of user equipment (UEs), a multi-user packet including a plurality of transport blocks combined into a combined transport block, wherein each transport block, of the plurality of transport blocks, is separately encoded using a particular encoding procedure and aggregated into the combined transport block; receiving, from one or more UEs of the group of UEs, hybrid automatic repeat request (HARQ) feedback indicating a decoding failure of one or more transport blocks of the multi-user packet; and retransmitting one or more packets to convey the one or more transport blocks subject to the decoding failure.

In some aspects, a method of wireless communication, performed by a user equipment, may include receiving a multi-user packet including a plurality of transport blocks combined into a combined transport block, wherein each transport block, of the plurality of transport blocks, is separately encoded using a particular encoding procedure and aggregated into the combined transport block; transmitting HARQ feedback indicating a decoding failure of a particular transport block of the multi-user packet; and receiving a retransmission of one or more packets to convey one or more transport blocks, including the particular transport block, subject to one or more respective decoding failures.

In some aspects, a base station for wireless communication may include a memory and one or more processors operatively coupled to the memory. The memory and the one or more processors may be configured to transmit, to a group of UEs, a multi-user packet including a plurality of transport blocks combined into a combined transport block, wherein each transport block, of the plurality of transport blocks, is separately encoded using a particular encoding procedure and aggregated into the combined transport block; receive, from one or more UEs of the group of UEs, HARQ feedback indicating a decoding failure of one or more transport blocks of the multi-user packet; and retransmit one or more packets to convey the one or more transport blocks subject to the decoding failure.

In some aspects, a user equipment for wireless communication may include a memory and one or more processors operatively coupled to the memory. The memory and the one or more processors may be configured to receive a multi-user packet including a plurality of transport blocks combined into a combined transport block, wherein each transport block, of the plurality of transport blocks, is separately encoded using a particular encoding procedure and aggregated into the combined transport block; transmit HARQ feedback indicating a decoding failure of a particular transport block of the multi-user packet; and receive a retransmission of one or more packets to convey one or more transport blocks, including the particular transport block, subject to one or more respective decoding failures.

In some aspects, a non-transitory computer-readable medium may store one or more instructions for wireless communication. The one or more instructions, when executed by one or more processors of a base station, may cause the one or more processors to transmit, to a group of UEs, a multi-user packet including a plurality of transport blocks combined into a combined transport block, wherein each transport block, of the plurality of transport blocks, is separately encoded using a particular encoding procedure and aggregated into the combined transport block; receive, from one or more UEs of the group of UEs, HARQ feedback indicating a decoding failure of one or more transport blocks of the multi-user packet; and retransmit one or more packets to convey the one or more transport blocks subject to the decoding failure.

In some aspects, a non-transitory computer-readable medium may store one or more instructions for wireless communication. The one or more instructions, when executed by one or more processors of a UE, may cause the one or more processors to receive a multi-user packet including a plurality of transport blocks combined into a combined transport block, wherein each transport block, of the plurality of transport blocks, is separately encoded using a particular encoding procedure and aggregated into the combined transport block; transmit HARQ feedback indicating a decoding failure of a particular transport block of the multi-user packet; and receive a retransmission of one or more packets to convey one or more transport blocks, including the particular transport block, subject to one or more respective decoding failures.

In some aspects, an apparatus for wireless communication may include means for transmitting, to a group of UEs, a multi-user packet including a plurality of transport blocks combined into a combined transport block, wherein each transport block, of the plurality of transport blocks, is separately encoded using a particular encoding procedure and aggregated into the combined transport block; means for receiving, from one or more UEs of the group of UEs, HARQ feedback indicating a decoding failure of one or more transport blocks of the multi-user packet; and means for retransmitting one or more packets to convey the one or more transport blocks subject to the decoding failure.

In some aspects, an apparatus for wireless communication may include means for receiving a multi-user packet including a plurality of transport blocks combined into a combined transport block, wherein each transport block, of the plurality of transport blocks, is separately encoded using a particular encoding procedure and aggregated into the combined transport block; means for transmitting HARQ feedback indicating a decoding failure of a particular transport block of the multi-user packet; and means for receiving a retransmission of one or more packets to convey one or more transport blocks, including the particular transport block, subject to one or more respective decoding failures.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3D are diagrams illustrating examples associated with soft-combining for hybrid automatic repeat request feedback, in accordance with various aspects of the present disclosure.

FIGS. 4-5 are diagrams illustrating example processes associated with soft-combining for hybrid automatic repeat request feedback, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
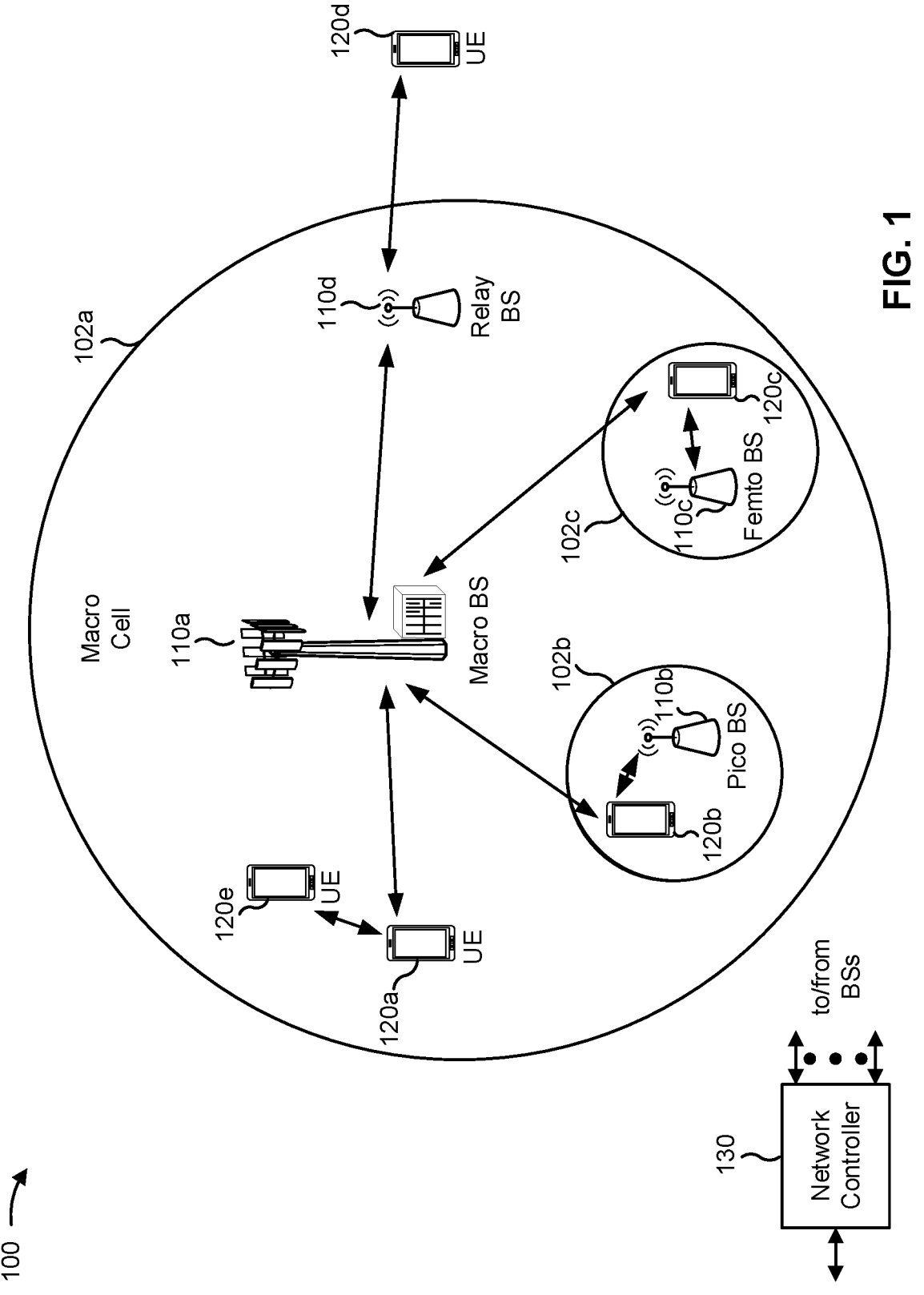
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
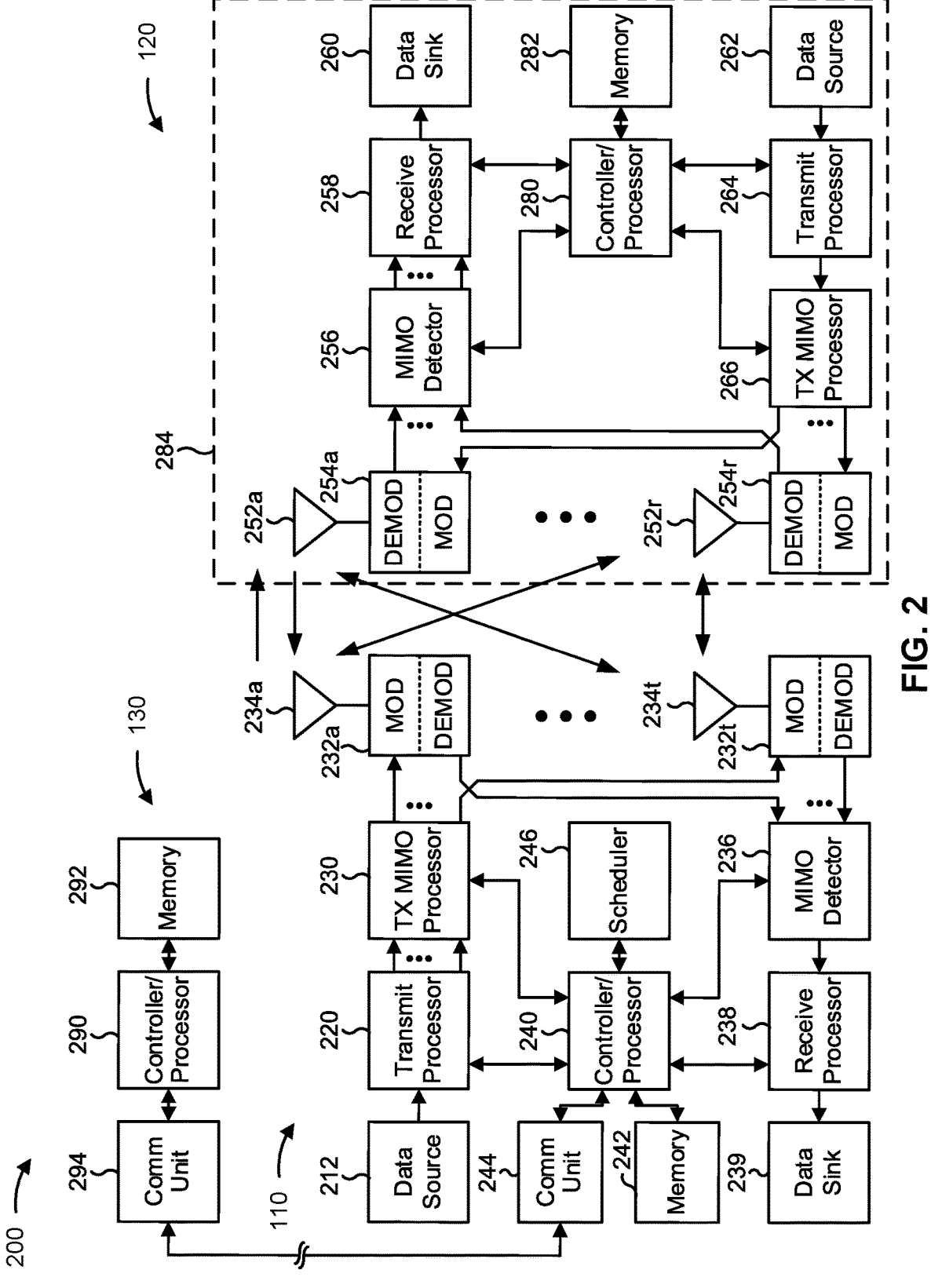
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process the output sample (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3A-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3A-5.

Controller/processor 240 of base station 110, controller/processor 280 of UE 120, and/or any other component(s) of FIG. 2 may perform one or more techniques associated with soft-combining for hybrid automatic repeat request feedback, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a multi-user packet including a plurality of transport blocks combined into a combined transport block, wherein each transport block, of the plurality of transport blocks, is separately encoded using a particular encoding procedure and aggregated into the combined transport block, means for transmitting hybrid automatic repeat request (HARQ) feedback indicating a decoding failure of a particular transport block of the multi-user packet, means for receiving a retransmission of one or more packets to convey one or more transport blocks, including the particular transport block, subject to one or more respective decoding failures, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a group of UEs, a multi-user packet including a plurality of transport blocks combined into a combined transport block, wherein each transport block, of the plurality of transport blocks, is separately encoded using a particular encoding procedure and aggregated into the combined transport block, means for receiving, from one or more UEs of the group of UEs, HARQ feedback indicating a decoding failure of one or more transport blocks of the multi-user packet, means for retransmitting one or more packets to convey the one or more transport blocks subject to the decoding failure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, UEs and/or BSs may transmit relatively small data packets. For example, in Industrial Internet of Things (IIoT) deployments, BSs may transmit data packets that are much smaller than those transmitted to other types of UEs, such as smart phones. To improve coding gain and increase an efficiency of network resource utilization, a BS may combine a plurality of packets into a single packet and transmit the single packet to a plurality of UEs. The single packet may be termed a multi-user packet. For example, a BS may combine a first packet that is to be transmitted to a first UE with a second packet that is to be transmitted to a second UE into a single multi-user packet. In this case, the BS may transmit the single multi-user packet to the first UE and the second UE. The first UE and the second UE may then recover respective packets concatenated within the single multi-user packet.

When generating a multi-user packet, the BS may concatenate a plurality of transport blocks into a single aggregated transport block, thereby consolidating a plurality of packets (e.g., that were to convey the plurality of transport blocks) into a single multi-user packet. The BS may add a physical (PHY) layer header to the aggregated transport block to form a combined transport block. The BS may transmit the combined transport block via a multi-user packet in a physical downlink shared channel (PDSCH).

In connection with transmitting the multi-user packet, the BS may transmit downlink control information (DCI) with a group radio network temporary identifier (G-RNTI) to a group of UEs for which the multi-user packet includes respective transport blocks. In this case, each UE, of the group of UEs, may use the G-RNTI to decode the multi-user packet of the PDSCH and recover a respective transport block. Based at least in part on decoding the multi-user packet and parsing a header thereof, each UE may identify a respective transport block. For example, the multi-user packet may have a first header indicating that a first transport block is for a first UE, a second header indicating that a second transport block is for a second UE, and/or the like.

In some cases, when a UE fails to decode a packet, the UE may request a retransmission. For example, when a UE fails to decode a packet, the UE may transmit a hybrid automatic repeat request (HARQ) feedback message, such as a HARQ NACK, to a BS. The BS may receive the HARQ feedback message and retransmit the packet. However, retransmitting a whole multi-user packet to ensure that a single transport block thereof is successfully decoded may result in an inefficient utilization of network resources.

Some aspects described herein use soft-combining for HARQ messages for multi-user packet deployments. For example, a BS may encode and transmit a multi-user packet and may receive a HARQ NACK for the multi-user packet, which may trigger a retransmission. In this case, the BS may retransmit only transport blocks for which one or more HARQ NACKs are received (and not transport blocks for which a HARQ acknowledgement (ACK) is received). In some aspects, the BS may generate a new multi-user packet to convey the transport blocks for which the HARQ NACK is received, thereby improving an efficiency of network resource utilization relative to transmitting dedicated packets for each transport block. Additionally, or alternatively, the BS may fill the multi-user packet with new transport blocks (along with retransmitted transport blocks), thereby further improving an efficiency of network resource utilization.

FIGS. 3A-3D are diagrams illustrating examples 300/350/360/370 of soft-combining for HARQ feedback, in accordance with various aspects of the present disclosure. As shown in FIG. 3A-3D, examples 300/350/360/370 may include a BS 110 and a group of UEs 120.

Figure 3A:
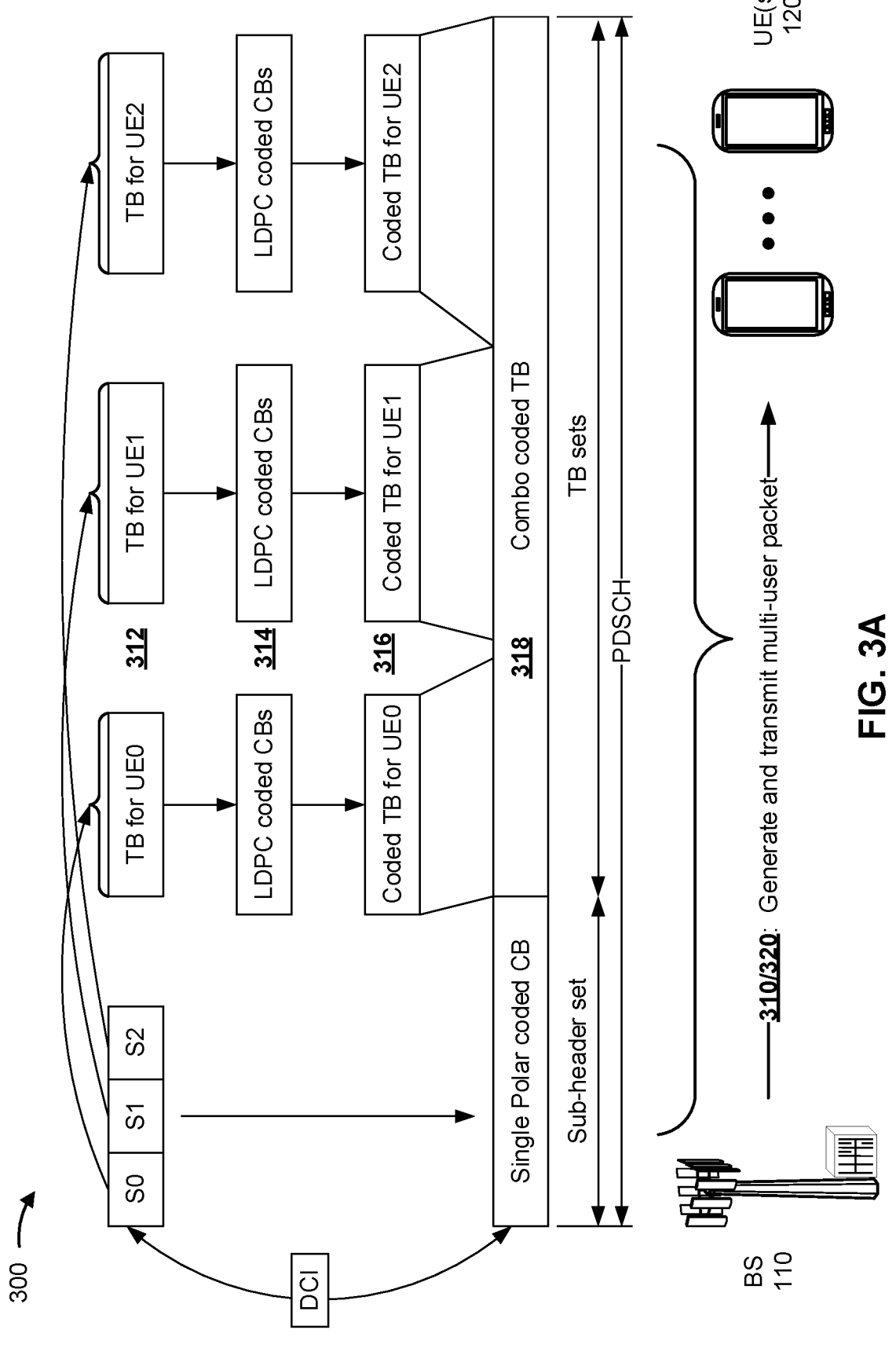

As further shown in FIG. 3A, and by reference number 310, BS 110 may generate a transport block for a multi-user packet. For example, at 312, BS 110 may identify a set of transport blocks for aggregation and a set of headers corresponding to the set of transport blocks. In this case, the set of transport blocks may include a first transport block conveying data for a first UE 120 and associated with a first sub-header, a second transport block conveying data for a second UE 120 and associated with a second sub-header, a third transport block conveying data for a third UE 120 and associated with a first sub-header, and/or the like. At 314, BS 110 may apply a common coding scheme to each of the set of transport blocks. For example, BS 110 may perform cyclic redundancy check (CRC) insertion and code block segmentation to each transport block to generate low-density parity check (LDPC) coded code blocks. At 316, BS 110 may apply rate matching and coded bit selection to each LDPC coded code block to generate a set of coded transport blocks for each UE 120 of the group of UEs 120. At 318, BS 110 may aggregate the coded transport blocks into a single combined coded transport block (which may be termed a transport block set) and may apply polar coding to the sub-headers to generate a single polar coded code block (which may be termed a sub-header set). In this case, as shown by reference number 320, BS 110 may transmit a PDSCH that includes a first multi-user packet to convey the sub-header set and the transport block set.

Figure 3B:
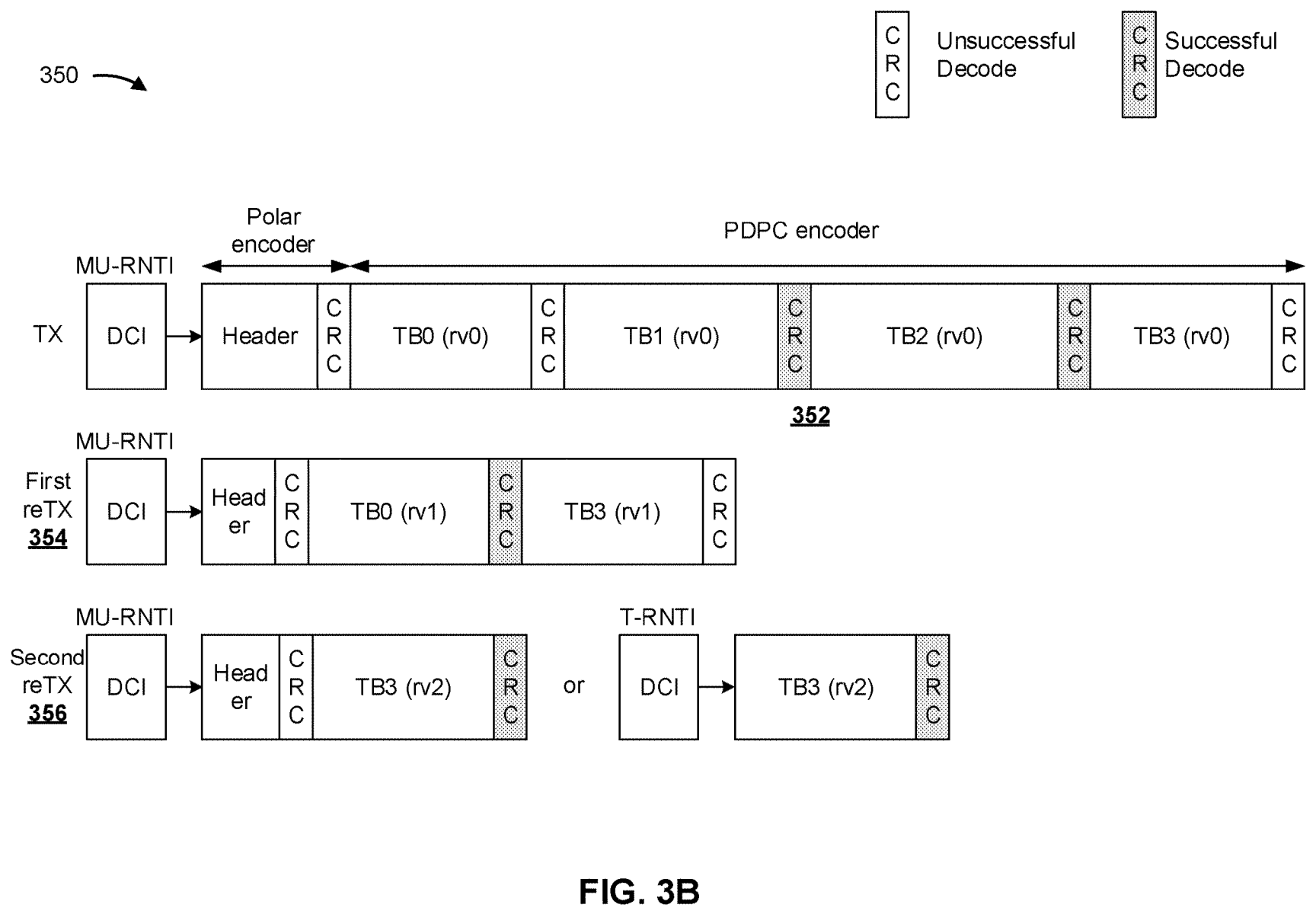

As shown in FIG. 3B, and in example 350, the first multi-user packet may include a header and a set of aggregated transport blocks with respective CRCs, and BS 110 may transmit the first multi-user packet with a DCI (e.g., including a multi-user (MU)-RNTI). As shown by reference number 352, transport blocks TB1 and TB2 are decoded successfully (e.g., BS 110 receives HARQ ACKs for TB1 and TB2), but transport blocks TB0 and TB3 are not decoded successfully (e.g., BS 110 receives HARQ NACKs for TB0 and TB3 from respective UEs 120).

In this case, as shown by reference number 354, BS 110 may retransmit unsuccessfully decoded transport blocks. For example, BS 110 may transmit a second multi-user packet including a header and the unsuccessfully decoded transport blocks with respective CRCs, but not with the successfully decoded transport blocks. In this way, BS 110 reduces a utilization of network resources. A UE 120 may perform soft-combining for TB0 from the first multi-user packet (e.g., TB0 redundancy version (rv) 0 (rv0) with TB0 from the second multi-user packet (TB0 rv1), which may improve a likelihood that the UE 120 successfully decodes TB0.

As further shown in FIG. 3B, and by reference number 356, based at least in part on TB0 being successfully decoded using soft-combining (e.g., UE 120 may use a circular buffer to perform soft-combining and may provide a HARQ ACK to BS 110) and TB3 not being successfully decoded despite using soft-combining (e.g., when BS 110 receives a HARQ NACK), BS 110 may determine to retransmit TB3. In this case, based at least in part on there being a single transport block to transmit, rather than a plurality of transport blocks, BS 110 may transmit a dedicated (e.g., non-multi-user) packet with an MU-RNTI or a T-RNTI in a corresponding DCI. In this case, UE 120 may use soft-combining for TB3s from the first multi-user packet (e.g., TB3 rv0), the second multi-user packet (e.g., TB3 rv1), and the dedicated packet (e.g., TB3 rv2). In this case, a UE 120 is successful at decoding TB3.

Figure 3C:
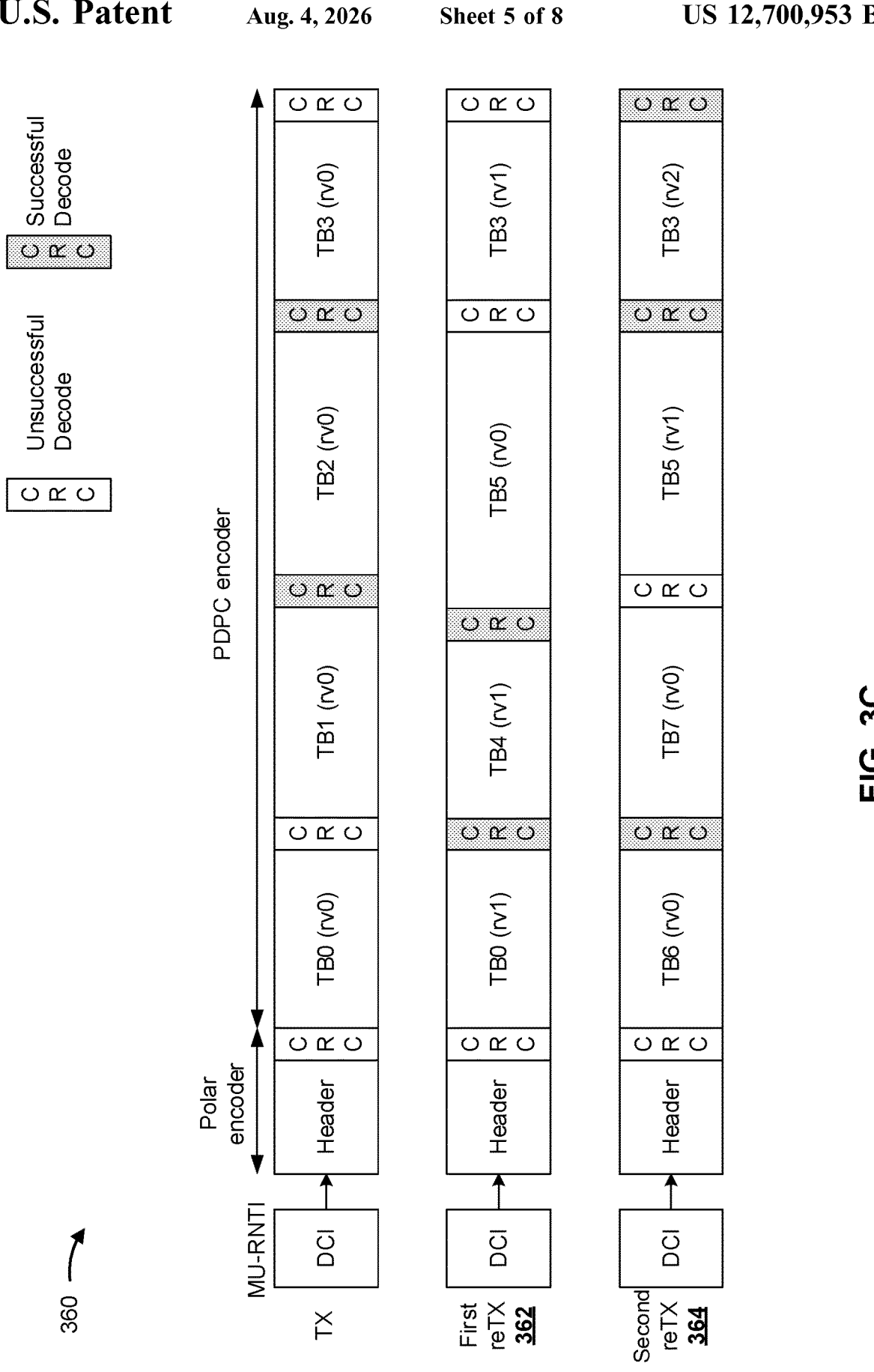

As shown in FIG. 3C, and by example 360 and reference number 362, in another example, when respective UEs 120 do not successfully decode TB0 and TB3 based at least in part on a transmission of the first multi-user packet, BS 110 may generate a second multi-user packet that includes TB0, TB3, and one or more new transport blocks. For example, BS 110 may include new transport blocks TB4 and TB5 in the second multi-user packet. In this way, BS 110 ensures efficient utilization of network resources. Similarly, as shown by reference number 364, when respective UEs 120 do not successfully decode TB3 (e.g., based at least in part on soft-combining TB3 rv0 and TB3 rv1) and TB5, BS 110 may generate a third multi-user packet that includes TB3, TB5, and one or more new transport blocks (e.g., TB6 and TB7). In some aspects, BS 110 may include a single DCI for a multi-user packet that includes a retransmission and a new packet. For example, BS 110 may include HARQ process identifier information, modulation and coding scheme information, and/or the like, and may include a new sub-header to enable UEs 120 that receive the DCI to determine a size and set of resources within the PDSCH. In some aspects, sub-headers of the multi-user packet may include transport block size and/or other information to enable UEs 120 to determine which transport blocks are for which UEs 120. For example, BS 110 may include a new data indicator (NDI) in each sub-header to enable one or more UEs 120 to identify new packets in a retransmission multi-user packet. Additionally, or alternatively, BS 110 may include redundancy version information, and/or the like.

Figure 3D:
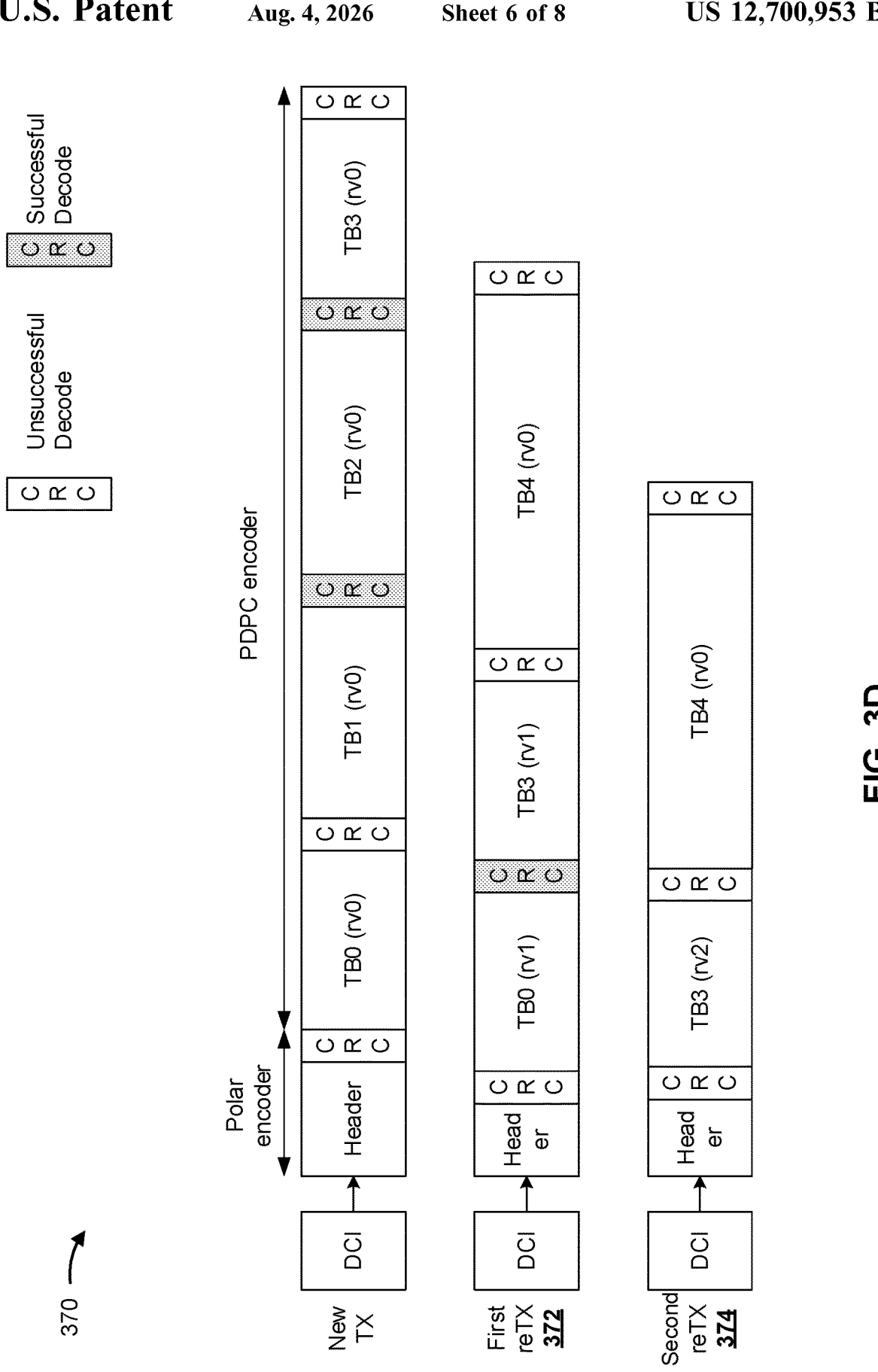

As shown in FIG. 3D, and by example 370 and reference number 372, rather than including a plurality of new transport blocks in the second multi-user packet (each with the same size), BS 110 may include different sized transport blocks in the second multi-user packet. For example, BS 110 may retransmit TB0 and TB3 with the same size in the second multi-user packet as in the first multi-user packet, but may include a new transport block TB4 that is a different size than TB0 and TB3. As shown by reference number 374, when BS 110 generates a third multi-user packet to retransmit TB3 and TB4 (e.g., based at least in part on unsuccessful decoding of TB3 and TB4 by respective UEs 120), TB3 and TB4 are each associated with the same respective size as in previous multi-user packets. In other words, TB3 rv0, TB3 rv1, and TB3 rv2 are each associated with a first size and TB4 rv0 and TB4 rv1 are each associated with a second size.

As indicated above, FIGS. 3A-3D are provided as examples. Other examples may differ from what is described with respect to FIGS. 3A-3D.

FIG. 4 is a diagram illustrating an example process 400 performed, for example, by a BS, in accordance with various aspects of the present disclosure. Example process 400 is an example where the BS (e.g., BS 110 and/or the like) performs operations associated with soft-combining for hybrid automatic repeat request feedback.

As shown in FIG. 4, in some aspects, process 400 may include transmitting, to a group of UEs, a multi-user packet including a plurality of transport blocks combined into a combined transport block, wherein each transport block, of the plurality of transport blocks, is separately encoded using a particular encoding procedure and aggregated into the combined transport block (block 410). For example, the BS (e.g., using transmit processor 220, receive processor 238, controller/processor 240, memory 242, and/or the like) may transmit, to a group of UEs, a multi-user packet including a plurality of transport blocks combined into a combined transport block, as described above. In some aspects, each transport block, of the plurality of transport blocks, is separately encoded using a particular encoding procedure and aggregated into the combined transport block.

As further shown in FIG. 4, in some aspects, process 400 may include receiving, from one or more UEs of the group of UEs, HARQ feedback indicating a decoding failure of one or more transport blocks of the multi-user packet (block 420). For example, the BS (e.g., using transmit processor 220, receive processor 238, controller/processor 240, memory 242, and/or the like) may receive, from one or more UEs of the group of UEs, HARQ feedback indicating a decoding failure of one or more transport blocks of the multi-user packet, as described above.

As further shown in FIG. 4, in some aspects, process 400 may include retransmitting one or more packets to convey the one or more transport blocks subject to the decoding failure (block 430). For example, the BS (e.g., using transmit processor 220, receive processor 238, controller/processor 240, memory 242, and/or the like) may retransmit one or more packets to convey the one or more transport blocks subject to the decoding failure, as described above.

Process 400 may include additional aspects, such as any single aspect or any combination of aspects described below and/or in connection with one or more other processes described elsewhere herein.

In a first aspect, downlink control information, of a physical downlink control channel, associated with the multi-user packet includes information identifying one or more parameters of a physical downlink shared channel with which the multi-user packet is conveyed.

In a second aspect, alone or in combination with the first aspect, downlink control information, of a physical downlink control channel, associated with the multi-user packet includes information identifying one or more parameters of a sub-header set associated with the multi-user packet.

In a third aspect, alone or in combination with one or more of the first and second aspects, one or more sub-headers, of the sub-header set, are jointly encoded using polar encoding.

In a fourth aspect, alone or in combination with one or more of the first through third aspects, the plurality of transport blocks are encoded using low-density parity check codes for the group of UEs.

In a fifth aspect, alone or in combination with one or more of the first through fourth aspects, retransmitting the one or more packets includes retransmitting the one or more packets and refraining from including new transport blocks in a retransmission that includes the one or more packets.

In a sixth aspect, alone or in combination with one or more of the first through fifth aspects, the one or more packets include a single packet, and retransmitting the one or more packets comprises retransmitting the single packet via a unicast transmission.

In a seventh aspect, alone or in combination with one or more of the first through sixth aspects, downlink control information transmitted in connection with the multi-user packet includes information for at least one of: a frequency domain resource assignment, a time domain resource assignment, a hybrid automatic repeat request process identifier, a modulation and coding scheme, a new data indicator, a redundancy version, a downlink assignment index, or a combination thereof.

In an eighth aspect, alone or in combination with one or more of the first through seventh aspects, downlink control information transmitted in connection with the multi-user packet includes information identifying a size or set of resources for a sub-header set.

In a ninth aspect, alone or in combination with one or more of the first through eighth aspects, a first transport block size of the plurality of transport blocks of the multi-user packet and a second transport block size of the one or more transport blocks subject to the decoding failure and included in the one or more packets are a common transport block size.

In a tenth aspect, alone or in combination with one or more of the first through ninth aspects, retransmitting the one or more packets comprises retransmitting the one or more packets with the one or more transport blocks subject to the decoding failure and with one or more new transport blocks for one or more UEs of the group of UEs in a retransmission.

In an eleventh aspect, alone or in combination with one or more of the first through tenth aspects, the retransmission includes a new data indicator to enable the one or more UEs to identify the one or more new transport blocks.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a UE, in accordance with various aspects of the present disclosure. Example process 500 is an example where the UE (e.g., UE 120 and/or the like) performs operations associated with soft-combining for hybrid automatic repeat request feedback.

As shown in FIG. 5, in some aspects, process 500 may include receiving a multi-user packet including a plurality of transport blocks combined into a combined transport block, wherein each transport block, of the plurality of transport blocks, is separately encoded using a particular encoding procedure and aggregated into the combined transport block (block 510). For example, the UE (e.g., using receive processor 258, transmit processor 264, controller/processor 280, memory 282, and/or the like) may receive a multi-user packet including a plurality of transport blocks combined into a combined transport block, as described above. In some aspects, each transport block, of the plurality of transport blocks, is separately encoded using a particular encoding procedure and aggregated into the combined transport block.

As further shown in FIG. 5, in some aspects, process 500 may include transmitting HARQ feedback indicating a decoding failure of a particular transport block of the multi-user packet (block 520). For example, the UE (e.g., using receive processor 258, transmit processor 264, controller/processor 280, memory 282, and/or the like) may transmit HARQ feedback indicating a decoding failure of a particular transport block of the multi-user packet, as described above.

As further shown in FIG. 5, in some aspects, process 500 may include receiving a retransmission of one or more packets to convey one or more transport blocks, including the particular transport block, subject to one or more respective decoding failures (block 530). For example, the UE (e.g., using receive processor 258, transmit processor 264, controller/processor 280, memory 282, and/or the like) may receive a retransmission of one or more packets to convey one or more transport blocks, including the particular transport block, subject to one or more respective decoding failures, as described above.

Process 500 may include additional aspects, such as any single aspect or any combination of aspects described below and/or in connection with one or more other processes described elsewhere herein.

In a first aspect, downlink control information, of a physical downlink control channel, associated with the multi-user packet includes information identifying one or more parameters of a physical downlink shared channel with which the multi-user packet is conveyed.

In a second aspect, alone or in combination with the first aspect, downlink control information, of a physical downlink control channel, associated with the multi-user packet includes information identifying one or more parameters of a sub-header set associated with the multi-user packet.

In a third aspect, alone or in combination with one or more of the first and second aspects, one or more sub-headers, of the sub-header set, are jointly encoded using polar encoding.

In a fourth aspect, alone or in combination with one or more of the first through third aspects, the plurality of transport blocks is encoded using low-density parity check codes for the group of UEs.

In a fifth aspect, alone or in combination with one or more of the first through fourth aspects, receiving the one or more

15 | 16 packets includes receiving the one or more packets and refraining from including new transport blocks in a retransmission that includes the one or more packets.

In a sixth aspect, alone or in combination with one or more of the first through fifth aspects, the one or more packets include a single packet, and receiving the one or more packets includes receiving the single packet via a unicast transmission.

In a seventh aspect, alone or in combination with one or more of the first through sixth aspects, downlink control information received in connection with the multi-user packet includes information for at least one of: a frequency domain resource assignment, a time domain resource assignment, a hybrid automatic repeat request process identifier, a modulation and coding scheme, a new data indicator, a redundancy version, a downlink assignment index, or a combination thereof.

In an eighth aspect, alone or in combination with one or more of the first through seventh aspects, downlink control information received in connection with the multi-user packet includes information identifying a size or set of resources for a sub-header set.

In a ninth aspect, alone or in combination with one or more of the first through eighth aspects, a first transport block size of the plurality of transport blocks of the multi-user packet and a second transport block size of the one or more transport blocks subject to the decoding failure and included in the one or more packets are a common transport block size.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network entity, comprising:

transmitting, to a group of user equipments (UEs), a multi-user packet including a plurality of transport blocks combined into a combined transport block, wherein each transport block, of the plurality of transport blocks, is separately encoded using a first encoding technique and aggregated into the combined transport block, and wherein a plurality of sub-headers corresponding to the plurality of transport blocks are jointly encoded as a set using a second encoding technique that is distinct from the first encoding technique;

receiving, from one or more UEs of the group of UEs, hybrid automatic repeat request (HARQ) feedback indicating a decoding failure of one or more transport blocks of the multi-user packet; and retransmitting one or more packets to convey the one or more transport blocks subject to the decoding failure.

2. The method of claim 1, wherein downlink control information, of a physical downlink control channel, associated with the multi-user packet includes information identifying one or more parameters of a physical downlink shared channel with which the multi-user packet is conveyed.

3. The method of claim 1, wherein downlink control information, of a physical downlink control channel, associated with the multi-user packet includes information identifying one or more parameters of a sub-header set associated with the plurality of sub-headers.

4. The method of claim 1, wherein the second encoding technique comprises polar encoding.

5. The method of claim 1, wherein the first encoding technique comprises low-density parity check codes.

6. The method of claim 1, wherein retransmitting the one or more packets comprises:

retransmitting the one or more packets and refraining from including new transport blocks in a retransmission that includes the one or more packets.

7. The method of claim 1,
wherein the one or more packets include a single packet; and
  wherein retransmitting the one or more packets comprises:
    retransmitting the single packet via a unicast transmission.

8. The method of claim 1,
wherein downlink control information transmitted in connection with the multi-user packet includes information for at least one of:
  a frequency domain resource assignment,
  a time domain resource assignment,
  a hybrid automatic repeat request process identifier,
  a modulation and coding scheme,
  a new data indicator,
  a redundancy version, or
  a downlink assignment index.

9. The method of claim 1, wherein downlink control information transmitted in connection with the multi-user packet includes information identifying a size or set of resources for a sub-header set associated with the plurality of sub-headers.

10. The method of claim 1,
wherein a size of a first transport block of the plurality of transport blocks of the multi-user packet is equal to a size of a second transport block of the one or more transport blocks subject to the decoding failure and included in the one or more packets.

11. The method of claim 1,
wherein retransmitting the one or more packets comprises:
  retransmitting the one or more packets with the one or more transport blocks subject to the decoding failure and with one or more new transport blocks for one or more UEs of the group of UEs in a retransmission.

12. The method of claim 11,
wherein the retransmission includes a new data indicator to enable the one or more UEs to identify the one or more new transport blocks.

13. A method of wireless communication performed by a user equipment (UE), comprising:
  receiving a multi-user packet including a plurality of transport blocks combined into a combined transport block, wherein each transport block, of the plurality of transport blocks, is separately encoded using a first encoding technique and aggregated into the combined transport block, and wherein a plurality of sub-headers corresponding to the plurality of transport blocks are jointly encoded as a set using a second encoding technique that is distinct from the first encoding technique;
  transmitting hybrid automatic repeat request (HARQ) feedback indicating a decoding failure of a particular transport block of the multi-user packet; and
  receiving a retransmission of one or more packets to convey one or more transport blocks, including the particular transport block, subject to one or more respective decoding failures.

14. The method of claim 13, wherein downlink control information, of a physical downlink control channel, associated with the multi-user packet includes information identifying one or more parameters of a physical downlink shared channel with which the multi-user packet is conveyed.

15. The method of claim 13,
wherein downlink control information, of a physical downlink control channel, associated with the multi-user packet includes information identifying one or more parameters of a sub-header set associated with the plurality of sub-headers.

16. The method of claim 13, wherein the second encoding technique comprises polar encoding.

17. The method of claim 13, wherein the first encoding technique comprises low-density parity check codes.

18. The method of claim 13,
wherein receiving the one or more packets comprises:
  receiving the one or more packets and refraining from including new transport blocks in a retransmission that includes the one or more packets.

19. The method of claim 13,
wherein the one or more packets include a single packet; and
  wherein receiving the one or more packets comprises:
    receiving the single packet via a unicast transmission.

20. The method of claim 13,
wherein downlink control information received in connection with the multi-user packet includes information for at least one of:
  a frequency domain resource assignment,
  a time domain resource assignment,
  a hybrid automatic repeat request process identifier,
  a modulation and coding scheme,
  a new data indicator,
  a redundancy version, or
  a downlink assignment index.

21. The method of claim 13,
wherein downlink control information received in connection with the multi-user packet includes information identifying a size or set of resources for a sub-header set associated with the plurality of sub-headers.

22. The method of claim 13,
wherein a size of a first transport block of the plurality of transport blocks of the multi-user packet is equal to a size of a second transport block of the one or more transport blocks subject to the decoding failure and included in the one or more packets.

23. A network entity for wireless communication, comprising:
  one or more memories; and
  one or more processors coupled to the one or more memories, the one or more processors configured to:
    transmit, to a group of user equipments (UEs), a multi-user packet including a plurality of transport blocks combined into a combined transport block, wherein each transport block, of the plurality of transport blocks, is separately encoded using a first encoding technique and aggregated into the combined transport block, and wherein a plurality of sub-headers corresponding to the plurality of transport blocks are jointly encoded as a set using a second encoding technique that is distinct from the first encoding technique;
    receive, from one or more UEs of the group of UEs, hybrid automatic repeat request (HARQ) feedback indicating a decoding failure of one or more transport blocks of the multi-user packet; and retransmit one or more packets to convey the one or more transport blocks subject to the decoding failure.

24. The network entity of claim 23, wherein downlink control information, of a physical downlink control channel, associated with the multi-user packet includes information identifying one or more parameters of a physical downlink shared channel with which the multi-user packet is conveyed.

25. The network entity of claim 23, wherein downlink control information, of a physical downlink control channel, associated with the multi-user packet includes information identifying one or more parameters of a sub-header set associated with the plurality of sub-headers.

26. The network entity of claim 23, wherein the first encoding technique comprises low-density parity check codes, and wherein the second encoding technique comprises polar encoding.

27. A user equipment (UE) for wireless communication, comprising:

one or more memories; and one or more processors coupled to the one or more memories, the one or more processors configured to:

receive a multi-user packet including a plurality of transport blocks combined into a combined transport block, wherein each transport block, of the plurality of transport blocks, is separately encoded using a first encoding technique and aggregated into the combined transport block, and wherein a plurality of sub-headers corresponding to the plurality of transport blocks are jointly encoded as a set using a second encoding technique that is distinct from the first encoding technique;

transmit hybrid automatic repeat request (HARQ) feedback indicating a decoding failure of a particular transport block of the multi-user packet; and receive a retransmission of one or more packets to convey one or more transport blocks, including the particular transport block, subject to one or more respective decoding failures.

28. The UE of claim 27, wherein downlink control information, of a physical downlink control channel, associated with the multi-user packet includes information identifying one or more parameters of a physical downlink shared channel with which the multi-user packet is conveyed.

29. The UE of claim 27, wherein downlink control information, of a physical downlink control channel, associated with the multi-user packet includes information identifying one or more parameters of a sub-header set associated with the plurality of sub-headers.

30. The UE of claim 27, wherein the first encoding technique comprises low-density parity check codes, and wherein the second encoding technique comprises polar encoding.

* * * * *